United States Patent
Patel et al.

(10) Patent No.: US 6,767,684 B1
(45) Date of Patent: Jul. 27, 2004

(54) TONER PROCESSES

(75) Inventors: Raj D. Patel, Oakville (CA); Michael A. Hopper, Toronto (CA); Edward G. Zwartz, Mississauga (CA); Allan K. Chen, Oakville (CA)

(73) Assignee: Xerox Corporation, Stamford, CT (US)

(*) Notice: Subject to any disclaimer, the term of this patent is extended or adjusted under 35 U.S.C. 154(b) by 3 days.

(21) Appl. No.: 10/354,228

(22) Filed: Jan. 29, 2003

(51) Int. Cl.$^7$ .......................... G03G 9/087; C08J 3/215
(52) U.S. Cl. ........................ 430/137.14; 430/109.1; 523/334
(58) Field of Search .................. 430/137.14, 109.1; 523/334, 335

(56) References Cited

U.S. PATENT DOCUMENTS

| | | | |
|---|---|---|---|
| 3,998,160 A | 12/1976 | Pearce | 101/426 |
| 4,128,202 A | 12/1978 | Buros | 235/493 |
| 4,517,268 A | 5/1985 | Gruber et al. | 430/39 |
| 4,557,991 A * | 12/1985 | Takagiwa et al. | 430/108.8 |
| 4,859,550 A | 8/1989 | Gruber et al. | 430/39 |
| 5,034,298 A | 7/1991 | Berkes et al. | 430/110 |
| 5,482,812 A | 1/1996 | Hopper et al. | 430/137 |
| 5,510,221 A | 4/1996 | Matalevich et al. | 430/106.6 |
| 5,552,252 A * | 9/1996 | Lundy et al. | 430/39 |
| 5,622,806 A | 4/1997 | Veregin et al. | 430/137 |
| 5,780,190 A | 7/1998 | Listigovers et al. | 430/39 |
| 5,914,209 A | 6/1999 | Grushkin | 430/106.6 |
| 5,945,245 A | 8/1999 | Mychajlowskij et al. | 430/137 |
| 5,994,020 A | 11/1999 | Patel et al. | 430/137 |
| 6,132,924 A * | 10/2000 | Patel et al. | 430/137.14 |
| 6,268,102 B1 | 7/2001 | Hopper et al. | 430/137.14 |
| 6,416,920 B1 | 7/2002 | Hopper et al. | 430/137.14 |

OTHER PUBLICATIONS

Copending Application Ser. No. 10/106,473, filed Mar. 25, 2002, on "Toner Processes" by Raj D. Patel et al.
Copending Application Ser. No. 10/106,512, filed Mar. 25, 2002, on "Magnetite Toner Processses" by Raj D. Patel et al.
Copending Application Ser. No.10/106,078, filed Mar. 25, 2002, on "Toner Processes" by Raj D. Patel et al.
Copending Application Ser. No. 09/877,747, filed Jun. 11, 2001, on "Toner Coagulant Processes" by Lu Jiang et al.
Copending Application Ser. No. 09/922,263, filed Aug. 6, 2001, on "Toner Coagulant Processes" by Raj D. Patel et al.
Copending Application Ser. No. 09/962,425, filed Sep. 24, 2001, on "Toner Processes" by Daryl Vanbesien et al.
Copending Application Ser. No. 09/976,943, filed Oct. 15, 2001, on "Toner Coagulant Processes" by Daryl Vanbesieh et al.
Copending Application Ser. No. 10/086,063, filed Mar. 1, 2002, on "Toner Processes" by Raj D. Patel et al.
Copending Application Ser. No. 10/106,520, filed Mar. 25, 2002, on "Toner Coagulant Processes" by Lu Jiang et al.
Copending Application Ser. No. 10/106,519, filed Mar. 25, 2002, on "Toner Processes" by Raj D. Patel et al.
Copending Application Ser. No. 10/106,514, filed Mar. 25, 2002, on "Toner Processes" by Raj D. Patel et al.
Copending Application Ser. No. 10/062,129, filed Feb. 4, 2002, on "Toner Processes" by Lu Jiang et al.

* cited by examiner

Primary Examiner—John L Goodrow
(74) Attorney, Agent, or Firm—E. O. Palazzo

(57) ABSTRACT

A toner process involving mixing a colorant dispersion comprising an acicular magnetite dispersion and a colorant dispersion with a latex, a wax dispersion, a crosslinked resin, and a coagulant.

43 Claims, No Drawings

TONER PROCESSES

RELATED APPLICATIONS AND PATENT

Illustrated in U.S. Pat. No. 6,638,577 on Toner Processes, filed Mar. 1, 2002 by Raj D. Patel, Valaria M. Farrugia, Daryl Vanbesien, and Edward G. Zwartz, the disclosure of which is totally incorporated herein by reference, is a process comprising heating a latex, a colorant dispersion, a polytetrafluoroethylene dispersion, and an organo metallic complexing component.

Illustrated in U.S. Pat. No. 6,673,505 on Toner Coagulant Processes, filed Mar. 25, 2002 by Lu Jiang, Armin R. Vokel, Chieh-Min Cheng, Michael A. Hopper, Walter Mychajlowskij and Raj D. Patel, the disclosure of which is totally incorporated herein by reference, is a process for the preparation of toner comprising (i) generating or providing a latex emulsion containing resin, water, and an ionic surfactant, and generating or providing a colorant dispersion containing colorant, water, and an ionic surfactant, or a nonionic surfactant;

(ii) blending the latex emulsion with the colorant dispersion;

(iii) adding to the resulting blend a coagulant of a polyamine salt of an acid wherein the salt is of an opposite charge polarity to that of the surfactant latex;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;

(vii) heating the resulting mixture of (vi) above about the Tg of the latex resin;

(viii) retaining the heating until the fusion or coalescence of resin and colorant is initiated;

(ix) changing the pH of the above (viii) mixture with an acid to arrive at a pH of about 1.5 to about 3.5 to thereby accelerate the fusion or the coalescence and resulting in toner particles comprised of resin, and colorant; and (x) optionally isolating the toner.

Illustrated In U.S. Pat. No. 6,617,092 on Toner Processes, filed Mar. 25, 2002 by Raj D. Patel and Michael A. Hopper, the disclosure of which is totally incorporated herein by reference, is a process for the preparation of a magnetic toner comprising heating a colorant dispersion containing acicular magnetite, a carbon black dispersion, a latex emulsion, and a wax dispersion.

Illustrated in U.S. Pat. No. 6,627,373 on Toner Processes, filed Mar. 25, 2002 by Raj D. Patel and Michael A. Hopper, the disclosure of which is totally incorporated herein by reference, is a process for the preparation of a magnetic toner comprising the heating of a colorant dispersion comprised of a magnetite dispersion, and a carbon black dispersion, and thereafter mixing with a basic cationic latex emulsion and a wax dispersion.

Illustrated in U.S. Pat. No. 6,541,175, filed Feb. 4, 2002 on Toner Processes by Lu Jiang, Walter Mychajlowskij, Guerino G. Sacripante, Raj D. Patel and Michael A. Hopper, the disclosure of which is totally incorporated herein by reference, is a process comprising:

(i) providing or generating an emulsion latex comprised of sodio sulfonated polyester resin particles by heating the particles in water at a temperature of from about 65° C. to about 90° C.;

(ii) adding with shearing to the latex (i) a colorant dispersion comprising from about 20 percent to about 50 percent of a predispersed colorant in water, followed by the addition of an organic or an inorganic acid;

(iii) heating the resulting mixture at a temperature of from about 45° C. to about 65° C. followed by the addition of a water insoluble metal salt or a water insoluble metal oxide thereby releasing metal ions and permitting aggregation and coalescence, optionally resulting in toner particles of from about 2 to about 25 microns in volume average diameter; and optionally (iv) cooling the mixture and isolating the product.

Illustrated in copending application U.S. Ser. No. 10/106, 473 on Toner Processes, filed Mar. 25, 2002 by Raj D. Patel; Michael A. Hopper, Vladislav Skorokhod, Richard P. N. Veregin, Michael S. Hawkins, and Paul J. Gerroir, the disclosure of which is totally incorporated herein by reference, is a process for the preparation of a toner comprising mixing a colorant dispersion comprising an acicular magnetite dispersion and a carbon black dispersion with a latex, a wax dispersion and a coagulant.

Illustrated in U.S. Pat. No. 6,656,658, filed Mar. 25, 2002 on Magnetite Toner Processes by Raj D. Patel et al., the disclosure of which is totally incorporated herein by reference, is a toner process comprising heating a mixture of an acidified dispersion of an acicular magnetite with a colorant dispersion of carbon black, a wax dispersion, and an acidic latex emulsion.

Illustrated in U.S. Pat. No. 6,656,657, filed Mar. 25, 2002 on Toner Processes by Raj D. Patel et al., the disclosure of which is totally incorporated herein by reference, is a toner process comprising heating an acidified dispersion of an acicular magnetite with an anionic latex, an anionic carbon black dispersion, and an anionic wax dispersion.

Illustrated in U.S. Pat. No. 6,495,302, filed Jun. 11, 2001 on Toner Coagulant Processes by Lu Jiang, Nan-Xing Hu, Raj D. Patel, Walter Mychajlowskij and Michael A. Hopper, the disclosure of which is totally incorporated herein by reference, is a process for the preparation of toner comprising (i) generating a latex emulsion of resin, water, and an ionic surfactant, and a colorant dispersion of a colorant, water, an ionic surfactant, or a nonionic surfactant, and wherein (ii) the latex emulsion is blended with the colorant dispersion;

(iii) adding to the resulting blend containing the latex and colorant a coagulant of a polyaluminum chloride with an opposite charge to that of the ionic surfactant latex colorant;

(iv) heating the resulting mixture below or equal to about the glass transition temperature (Tg) of the latex resin to form aggregates;

(v) optionally adding a second latex comprised of submicron resin particles suspended in an aqueous phase (iv) resulting in a shell or coating wherein the shell is optionally of from about 0.1 to about 1 micron in thickness, and wherein optionally the shell coating is contained on 100 percent of the aggregates;

(vi) adding an organic water soluble or water insoluble chelating component to the aggregates of (v) particles, followed by adding a base to change the resulting toner aggregate mixture from a pH which is initially from about 1.9 to about 3 to a pH of about 5 to about 9;

(vii) heating the resulting aggregate suspension of (vi) above about the Tg of the latex resin;

(viii) optionally retaining the mixture (vii) at a temperature of from about 70° C. to about 95° C.;

(ix) changing the pH of the (viii) mixture by the addition of an acid to arrive at a pH of about 1.7 to about 4; and (x) optionally isolating the toner.

Illustrated in U.S. Pat. No. 6,500,697, filed Aug. 6, 2001 on Toner Coagulant Processes by Raj D. Patel, Lori Rettinger and Michael A. Hopper, the disclosure of which is totally incorporated herein by reference, is a process comprising (i) blending a colorant dispersion of a colorant, water, and an anionic surfactant, or a nonionic surfactant with (ii) a latex emulsion comprised of resin, water, and an ionic surfactant;

(iii) adding to the resulting blend a first coagulant of polyaluminum sulfosilicate (PASS) and a second cationic co-coagulant having an opposite charge polarity to that of the latex surfactant;

(iv) heating the resulting mixture below about the glass transition temperature (Tg) of the latex resin;

(v) adjusting with a base the pH of the resulting toner aggregate mixture from a pH which is in the range of about 1.8 to about 3 to a pH range of about 5 to about 9;

(vi) heating above about the Tg of the latex resin;

(vii) changing the pH of the mixture by the addition of a metal salt to arrive at a pH of from about 2.8 to about 5; and (viii) optionally isolating the product.

Illustrated in U.S. Pat. No. 6,562,541, filed Sep. 24, 2001 on Toner Processes by Daryl Vanbesien, Raj D. Patel, Michael A. Hopper and Stephan D. Drappel, the disclosure of which is totally incorporated herein by reference, is a process for the preparation of toner comprising mixing a latex with a colorant mixture comprised of colorant, an ionic surfactant, and a polytetrafluoroethylene; adding a coagulant; heating the resulting mixture below about the glass transition temperature (Tg) of the latex resin; adding a stabilizer, heating above about the Tg of the latex resin; and optionally isolating the toner.

Illustrated in U.S. Pat. No. 6,576,389, filed Oct. 15, 2001 on Toner Coagulant Processes on Daryl Vanbesien, Raj D. Patel, Michael A. Hopper, David J. Sanders, Kurt I. Halfyard and Danielle C. Boils, the disclosure of which is totally incorporated herein by reference, is a process for the preparation of toner comprising mixing a colorant dispersion, a latex emulsion, a wax dispersion and coagulants comprising a colloidal alumina coated silica, and a polymetal halide.

Also of interest is U.S. Pat. No. 6,416,920, the disclosure of which is totally incorporated herein by reference, which illustrates a process for the preparation of toner comprising mixing a colorant, a latex, and a silica, which silica is coated with an alumina.

The appropriate components, such as for example, magnetites, waxes, coagulants, resin latexes, surfactants, and colorants, and processes of the above copending applications may be selected for the present invention in embodiments thereof.

BACKGROUND

This invention relates to toner processes, and more specifically, to aggregation and coalescence processes. More specifically, the present invention relates in embodiments to methods for the preparation of toner compositions by a chemical process, such as emulsion aggregation wherein latex particles are aggregated with a wax, a crosslinked gel, colorants, and a magnetite in the presence of a coagulant like a polymetal halide, or alternatively a mixture of coagulants, thereafter coalescing to provide toner particles which when developed by an electrographic process generates documents suitable for magnetic image character recognition or MICR.

A number of advantages are associated with the present invention in embodiments thereof including, for example, excellent hot offset, for example above about 210° C., and more specifically, from about 210° C. to about 230° C.; a fusing latitude of from about 20° C. to about 35° C., wherein fusing latitude refers to a temperature in which, when a developed image is fused, evidences no offset either to the substrate that the image is fused on, referred as "Cold" offset or an offset on the fuser roll referred as the "HOT" offset; a minimum fixing temperature of, for example, about 170° C. to about 195° C.; and extended photoreceptor life since the toner fusing temperature can be below about 195° C., such as from about 175° C. to about 190° C., as measured.

REFERENCES

In U.S. Pat. No. 6,132,924, the disclosure of which is, totally incorporated herein by reference, there is illustrated a process for the preparation of toner comprising mixing a colorant a latex, and a coagulant, followed by aggregation and coalescence, wherein the coagulant may be a polyaluminum chloride.

In U.S. Pat. No. 6,268,102, the disclosure of which is totally incorporated herein by reference, there is illustrated a process for the preparation of toner comprising mixing a colorant a latex, and a coagulant, followed by aggregation and coalescence, wherein the coagulant may be a polyaluminum sulfosilicate.

Illustrated in U.S. Pat. No. 5,994,020, the disclosure of which is totally incorporated herein by reference, are toner preparation processes, and more specifically, a process for the preparation of toner comprising (i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles.

Magnetic ink printing methods with inks containing magnetic particles are known. For example, there is disclosed in U.S. Pat. No. 3,998,160, the disclosure of which is totally incorporated herein by reference, that various magnetic inks have been used in printing digits, characters, or artistic designs on checks or bank notes. The magnetic ink used for these processes can contain, for example, acicular magnetic particles, such as a magnetite in a fluid medium, and a magnetic coating of ferric oxide, chromium dioxide, or similar materials dispersed in a vehicle comprising binders, and plasticizers. According to the disclosure of the '160 patent, there is provided a method of printing on a surface with an ink containing acicular magnetic particles in order that the authenticity of the printing can be verified, and wherein a pattern is formed on a carrier with the ink in the wet state, and wherein the particles are subjected to a magnetic aligning process while the ink is on the carrier. Subsequently, the wet ink is transferred to the surface, which transfer is accomplished with substantially aligned particles.

Disclosed in U.S. Pat. No. 4,128,202, the disclosure of which is totally incorporated herein by reference, is a device for transporting a document that has been mutilated or erroneously encoded and wherein there is provided a predetermined area for the receipt of correctly encoded magnetic image character recognition information (MICR). As indicated in this patent, the information is referred to as MICR characters, which characters can appear, for example, at the bottom of personal checks as printed numbers and symbols. These checks have been printed in an ink containing magnetizable particles therein, and when the information contained on the document is to be read, the document is passed through a sorter/reader which first magnetizes the magnetizable particles, and subsequently detects a magnetic field of the symbols resulting from the magnetic retentivity of the ink. The characters and symbols involved, according to the '202 patent, are generally segregated into three separate fields, the first field being termed a transient field, which contains the appropriate symbols and characters to identify the bank, bank branch, or the issuing source.

In U.S. Pat. No. 5,914,209, the disclosure of which is totally incorporated by reference, there is illustrated a process for preparing MICR toners using a combination of hard and soft magnetites, and lubricating wax and melt mixing with a resin followed by jetting and classifying the blend to provide toner compositions.

In U.S. Pat. No. 4,517,268, the disclosure of which is totally incorporated by reference, there is illustrated a process for preparing MICR toners using styrene copolymers, such as styrene butadiene, in the absence of a lubricating wax by melt mixing in a Banbury apparatus, followed by pulverizing the magnetite and the resin, followed by jetting and classifying to provide, for example, 10 to 12 micron toner size particles which when mixed with an additive package and a carrier provides a developer suitable for using in the Xerox Corporation 9700®.

Further patents relating to MICR processes are U.S. Pat. Nos. 4,859,550; 5,510,221; and 5,034,298, all illustrating, for example, the generation of MICR toners by conventional means such as that described in U.S. Pat. No. 4,517,268.

In U.S. Pat. No. 5,780,190, the disclosure of which is totally incorporated herein by reference, there is disclosed an ionographic process which comprises the generation of a latent image comprised of characters; developing the image with an encapsulated magnetic toner comprised of a core comprised of a polymer and soft magnetite, and wherein the core is encapsulated within a polymeric shell; and subsequently providing the developed image with magnetic ink characters thereon to a reader/sorter device.

In applications requiring MICR capabilities, the toners selected usually contain magnetites having specific properties, an important one of which is a high enough level of remanence or retentivity. Retentivity is a measure of the magnetism left when the magnetite is removed from the magnetic field, i.e., the residual magnetism. Also of value are toners with a high enough retentivity, such that when the characters are read, the magnetites produce a signal strength of equal to greater than about 100 percent. The signal level can vary in proportion to the amount of toner deposited on the document being generated. The signal strength of a toner composition can be measured by using known devices, including the MICR-Mate 1, manufactured by Checkmate Electronics, Inc.

In forming toner compositions for use with reprographic or xerographic print devices, emulsion aggregation processes are known. For example, emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256 and 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488 and 5,977,210. The components and processes of the Xerox patents can be selected for the present invention in embodiments thereof.

In addition, the following U.S. Patents relate to emulsion aggregation toner processes, the disclosures of which is totally incorporated herein by reference.

U.S. Pat. No. 5,922,501 illustrates a process for the preparation of toner comprising blending an aqueous colorant dispersion and a latex resin emulsion, and which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat. No. 5,945,245 illustrates a surfactant free process for the preparation of toner comprising heating a mixture of an emulsion latex, a colorant, and an organic complexing agent.

U.S. Pat. No. 5,482,812 illustrates a process for the preparation of toner compositions or toner particles comprising (i) providing an aqueous pigment dispersion comprised of a pigment, an ionic surfactant, and optionally a charge control agent; (ii) providing a wax dispersion comprised of wax, a dispersant comprised of nonionic surfactant, ionic surfactant or mixtures thereof; (iii) shearing a mixture of the wax dispersion and the pigment dispersion with a latex or emulsion blend comprised of resin, a counterionic surfactant with a charge polarity of opposite sign to that of the ionic surfactant and a nonionic surfactant; (iv) heating the above sheared blend below about the glass transition temperature (Tg) of the resin to form electrostatically bound toner size aggregates with a narrow particle size distribution; (v) adding additional ionic surfactant to the aggregated suspension of (iv) to ensure that no, or minimal additional particle growth of the electrostatically bound toner size aggregates occurs on further increasing the temperature to coalesce the aggregates into toner particles (vi); (vi) heating the mixture of (v) with bound aggregates above about or at the Tg of the resin; and optionally (vii) separating the toner particles from the aqueous slurry by filtration and thereafter optionally washing.

U.S. Pat. No. 5,622,806 describes a process for the preparation of toner compositions with controlled particle size comprising (i) preparing a pigment dispersion in water, which dispersion is comprised of a pigment, an ionic surfactant in amounts of from about 0.5 to about 10 percent by weight to water, and an optional charge control agent; (ii) shearing the pigment dispersion with a latex mixture comprised of a counterionic surfactant with a charge polarity of opposite sign to that of the ionic surfactant, a nonionic surfactant, and resin particles, thereby causing a flocculation or heterocoagulation of the formed particles of pigment, resin, and charge control agent; and (iii) stirring.

SUMMARY

It is a feature of the present invention to provide a toner with a number of the advantages illustrated herein, and more specifically, a magnetite containing toner for Magnetic Ink Character Recognition processes by, for example, selecting specific magnetites that provide an acceptable readability signal by a check reader, and wherein the resulting toners possess a sufficient magnetic signal, desirable melt fusing, hot offset, and fusing latitude temperatures, and which toners contain a gel or a crosslinked resin.

It is another feature of the present invention to provide a MICR toner prepared by a chemical process, especially an emulsion aggregation process, wherein the particle morphology can be tailored from, for example, a potato like shape to spherical shape.

It is also a feature of the present invention to provide a MICR toner by emulsion aggregation process thus enabling the incorporation into a toner of needle shape or acicular magnetite particles of about 450 nanometers to about 700 nanometers in size.

It is yet another feature of the present invention to provide a process that is capable of incorporating into toners needle shape or acicular magnetite, which have a coercivity of about 350 oersteds (Oe) which is about 2 to 3 times that of cubic or spherical magnetite, which have a coercivity of about 110 oersteds, to provide an adequate magnetic signal, for example greater then 100 percent, where 100 percent refers, for example, to the nominal signal for readability by a check reader.

In another feature there resides the preparation of a MICR toner by emulsion aggregation processes wherein the amount of acicular magnetite loading is about 23 to about 30 weight percent of toner, or about 45 to about 65 weight percent for either cubic or spherical magnetite to provide an adequate magnetic signal for readability by a check reader.

Also, in another feature there is disclosed a process for preparing a magnetite dispersion comprised of acicular or cubic iron oxide particles in water containing an anionic surfactant or a nonionic surfactant by either ball milling, attrition, polytroning or media milling resulting in iron oxide particle stabilized by the surfactant, and which dispersion is aggregated with latex particles and wax particles to obtain a MICR toner.

In another feature there is disclosed a process for preparing a MICR toner in which the magnetite dispersion comprising acicular iron oxide particles, water and an anionic or a nonionic surfactant, and wherein the iron oxide particle may settle due to the density differences, and therefore, such particles can be redispersed by a stirring, including homogenization to obtain a suitable pigment dispersion for the preparation of MICR toners.

EMBODIMENTS

Aspects of the present invention relate to a toner process comprising mixing a colorant dispersion comprising an acicular magnetite dispersion and a colorant with a latex containing a crosslinked resin, a latex containing a resin free of crosslinking, a wax dispersion, and a coagulant;

(i) a toner process wherein there is selected a latex, a magnetite dispersion that contains water and an anionic surfactant, a colorant dispersion which contains water and an anionic surfactant, and a wax dispersion comprised of submicron wax particles of from about 0.1 to about 0.5 micron in diameter by volume, and which wax is dispersed in an anionic surfactant;

(ii) wherein the latex is comprised of two emulsions, a noncrosslinked latex and a crosslinked latex, and wherein each of the latexes contain resin particles, water and an anionic surfactant;

(iii) adding to the resulting mixture with a pH of about 2 to about 2.9 a coagulant, and which coagulant is a polymetal halide, a cationic (iii) adding to the resulting mixture with a pH of about 2 to about 2.9 a coagulant, and which coagulant is a polymetal halide, a cationic surfactant, or mixtures thereof to primarily enable flocculation of the resin latexes, the magnetite, the colorant, and the wax;

(iv) heating the resulting mixture below about the glass transition temperature (Tg) of the latex resin to form toner sized aggregates;

(v) adding to the formed toner aggregates a second latex comprised of resin suspended in an aqueous phase containing an ionic surfactant and water;

(vi) adding to the resulting mixture a base to thereby change the pH from an initial about 2 to about 2.9 to a pH of from about 7 to about 8;

(vii) heating the resulting aggregate suspension of (vi) to about the Tg of the latex resin of (i);

(viii) optionally retaining the mixture temperature at from about 70° C. to about 95° C. optionally for a period of about 10 to about 60 minutes, followed by a pH reduction with an acid to arrive at a pH of about 5 to about 6 to assist in permitting the fusion or coalescence of the toner aggregates;

(ix) further retaining the mixture temperature at from about 85° C. to about 95° C. for an optional period of about 6 to about 12 hours to assist in permitting the fusion or coalescence of the toner aggregates and to obtain smooth particles; and (x) washing the resulting toner slurry; and isolating the toner; a process wherein the colorant dispersion contains an anionic surfactant; a process wherein the colorant is carbon black, and wherein the carbon black dispersion comprises carbon black particles dispersed in water and an anionic surfactant, and wherein the colorant is present in an amount of from about 4 to about 10 weight percent; a process wherein the amount of acicular magnetite selected is from about 20 to about 40 percent by weight of toner, and the coagulant is comprised of a first coagulant of a polymetal halide present in an amount of about 0.02 to about 2 percent by weight of toner, and a further second cationic surfactant coagulant present in an amount of about 0.1 to about 5 percent by weight of toner; a process wherein the amount of acicular magnetite selected is from about 23 to about 35 percent by weight of toner, and the amount of coagulant, which coagulant is a polymetal halide, is selected in an amount of about 0.05 to about 0.15 percent by weight of toner; a process wherein the acicular magnetite utilized exhibits a coercivity of from about 250 to about 700 Oe; a process wherein the acicular magnetite possesses a coercivity of from about 250 to about 500 Oe, a remanent magnetization (Br) of about 23 to about 39 emu/gram, and a saturation magnetization (Bm) of about 70 to about 90 emu/gram; a process wherein the toner exhibits a magnetic signal of about 90 to about 150 percent of the nominal where the nominal is a signal strength of about 100 percent; a process wherein the toner possesses a minimum fix temperature (MFT) of about 170° C. to about 195° C.; a process wherein the toner hot offset temperature (HOT) is from about 210° C. to about 250° C.; a process wherein the magnetite dispersion is obtained by ball milling, attrition, polytroning or media milling with an anionic surfactant resulting in magnetite particles suspended in water containing the anionic surfactant; a process wherein the colorant is carbon black, and the amount of the carbon black dispersion is from about 3 to about 10 percent by weight of toner; a process wherein the crosslinked resin contains resin particles of from about 0.15 to about 0.4 micron in volume average diameter, and the latex contains a resin free of crosslinking; a process wherein the magnetite size is from about 0.6 micron to about 0.1 micron in average volume diameter, and the colorant is carbon black, and the carbon black is from about 0.01 to about 0.2 micron in average volume diameter; a process wherein the acid is nitric, sulfuric, hydrochloric, citric or acetic acid, and the coagulant is comprised of a first coagulant of a polyaluminum chloride and a second coagulant of a cationic surfactant; a process wherein the base is selected from the group consisting of sodium hydroxide, potassium hydroxide, and ammonium hydroxide, and wherein the coagulant is comprised of a polyaluminum halide and a second coagulant is a cationic surfactant; a process wherein there is added to the formed toner aggregates the second latex comprised of submicron resin particles suspended in an aqueous phase containing an anionic surfactant, and wherein the second latex is selected in an amount of from about 10 to about 40 percent by weight of the initial latex (i) to form a shell thereover on the formed aggregates, and which shell is of an optional thickness of about 0.2 to about 0.8 micron, and wherein the coagulant is a polymetal halide; a process wherein the added latex contains the same resin as the initial latex of (i), or wherein the added latex contains a dissimilar resin than that of the initial latex; a process wherein the pH of the mixture resulting in (vi) is increased from about 2 to about 2.6 to about 6.5 to about 7.5, and wherein the base functions primarily as a stabilizer for the aggregates during coalescence (vii), and no or minimal toner particle size increase results, and wherein the coagulant is a polymetal halide; a process wherein the temperature at which toner sized aggregates are formed controls the size of the aggregates, and wherein the final toner size is from about 3 to about 15 microns in volume average diameter; a process wherein the aggregation (iv) temperature is from about 45° C. to about 60° C., and wherein the coalescence or fusion temperature of (vii) and (viii) is from about 80° C. to about 95° C., and wherein the coagulant is a polyaluminum halide; a process wherein the time of coalescence or fusion is from about 6 to about 12 hours, and wherein the toner resulting possesses a smooth morphology; a process wherein the latex contains a resin, which resin is free of crosslinking and which resin is selected from the group comprised of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile); a process wherein the resin contains a carboxylic acid selected from the group comprised of acrylic acid, methacrylic acid, itaconic acid, beta carboxy ethyl acrylate, fumaric acid, maleic acid, and cinnamic acid, and wherein a carboxylic acid is selected in an amount of from about 0.1 to about 10 weight percent; a process wherein a crosslinking component monomer is added to the resin, and wherein the monomer is optionally selected in an amount of from about 0.5 to about 15 percent by weight; a process wherein the latex contains a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid), and wherein the coagulant is a polymetal halide; a toner process comprising the heating of a magnetite dispersion, a colorant dispersion, a latex emulsion free of crosslinking, a crosslinked emulsion, and a coagulant of a polymetal halide, and wherein the mixture is aggregated by heating below the latex resin glass transition temperature; a process wherein there is further included a second coagulant of a cationic surfactant coagulant; a process wherein the coagulant is a polymetal halide polyaluminum chloride, and wherein the cationic coagulant is an alkylbenzyl dimethyl ammonium chloride; a process wherein the coagulant is polymetal halide of a polyaluminum chloride, a polyaluminum sulfosilicate, or a polyaluminum sulfate, and there is further added to the mixture a second cationic surfactant coagulant of an alkylbenzyl dimethyl ammonium chloride; a process wherein the wax dispersion contains a polyethylene wax, water, and an anionic surfactant, and wherein the wax is selected in an amount of from about 5 to about 20 weight percent; a process wherein the wax dispersion contains a polypropylene wax, water, and an anionic surfactant, and wherein the wax is selected in an amount of from about 5 to about 20 weight percent; a process wherein the second coagulant is selected from the group comprised of alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and cetyl pyridinium bromide present in the amount of about 0.1 to about 5 percent by weight of toner; a process wherein the acicular magnetite possesses a coercivity of about 250 to about 700 Oe, a particle size of about 0.6 micron in length×0.1 micron in diameter, a coercivity of from about 250 to about 500 Oe, a remanent magnetization (Br) of about 23 to 39 emu/gram, and a saturation magnetization (Bm) of about 70 to about 90 emu/gram; a coercivity of about 345 Oe, a remanent magnetization (Br) of about 35 emu/gram, and a saturation magnetization (Bm) of about 85 emu/gram; a coercivity of about 370 Oe, a remanent magnetization (Br) of about 33 emu/gram, and a saturation magnetization (Bm) of about 83 emu/gram; a magnetite with a coercivity of about 270 Oe, a remanent magnetization (Br) of about 20 emu/gram, and a saturation magnetization (Bm) of about 79 emu/gram; a coercivity of from about 250 to about 400 Oe, a remanent magnetization (Br) of about 23 to about 55 emu/gram, and a saturation magnetization (Bm) of about 70 to about 90 emu/gram; and wherein the acicular magnetite is present in the toner in an amount of from about 10 to about 40 weight percent; a process wherein the acicular magnetite possesses a coercivity of about 250 to about 700 Oe, a particle size of about 0.6 micron in length×0.1 micron in diameter, a magnetite with a coercivity of from about 250 to about 500 Oe, a remanent magnetization (Br) of about 23 to about 39 emu/gram, and a saturation magnetization (Bm) of about 70 to about 90 emu/gram; and wherein the wax is a polyethylene, a polypropylene, or mixtures thereof, and the colorant is carbon black; a process comprising heating a mixture of an acicular shaped magnetite dispersion, a black colorant dispersion, a crosslinked resin latex, a latex containing a resin free of crosslinking, and a coagulant, and wherein the heating involves a first heating and subsequently a second heating, and which second heating is at a higher temperature than the first heating; a process wherein the colorant in the colorant dispersion is a cyan, a magenta, a yellow, a black or mixtures thereof; a process wherein the coagulant is comprised of a mixture of coagulants of a polymetal halide, and a second cationic coagulant wherein the first coagulant is present in the amount of about 0.02 to about 0.2 percent by weight of toner, and the second coagulant is present in the amount of about 0.05 to about 2 percent by weight of toner; a process wherein the crosslinked resin is selected in an amount of from about 1 to about 40 weight percent; a process wherein the crosslinked resin is selected in an amount of from about 2 to about 25 weight percent; a process wherein the crosslinked resin is poly(styrene butylacrylate, beta carboxy ethyl acrylate divinyl benzene); a process wherein the resin free from crosslinking possesses a molecular weight $M_w$ of about 20,000 to about 500,000, and an onset glass transition (Tg) temperature of from about 45° C. to about 55° C.; a process wherein the crosslinked latex resin possesses a molecular weight $M_w$ in the range of about 100,000 to about 1,000,000, and an onset glass transition (Tg) temperature of about 48° C. to about 58° C.; a process further including a second coagulant; a process wherein the crosslinked resin latex is selected in an amount of from about 2 to about 15 weight percent, the latex free of a crosslinked resin is selected in an amount of from about 40 to about 65 weight percent, the magnetite is selected in an amount of from about 20 to about 35 weight percent, the wax is selected in an amount of from about 5 to about 15 weight percent, and wherein the total thereof of the components is about 100 percent based on the toner; a process wherein the resulting toner possesses a shape factor of from about 110 to about 148; a process wherein the colorant dispersion contains an anionic surfactant; a process wherein colorant dispersion is comprised of carbon black particles dispersed in water and an anionic surfactant; a process wherein the amount of acicular magnetite selected is from about 20 to about 35 percent by weight of toner, and the coagulant is a polymetal halide present in an amount of about 0.02 to about 0.2 percent by weight of toner; a process where the coagulant is a cationic surfactant present in the amount of about 0.1 to about 2 percent by weight of toner; a process wherein the coagulant is comprised of a mixture of a polymetal halide and a cationic surfactant; a process wherein the amount of acicular magnetite selected is from about 23 to about 32 percent by weight of toner, and the amount of coagulant, which coagulant is a polymetal halide, is present in an amount of about 0.05 to about 0.13 percent by weight of toner and the cationic surfactant coagulant is present in an amount of about 0.15 to about 1.5 percent by weight of toner; a process wherein the acicular magnetite utilized exhibits a coercivity of from about 250 to about 700 Oe; a process wherein the acicular magnetite possesses a coercivity of from about 250 to about 500 Oe, a remanent magnetization (Br) of about 23 to about 39 emu/gram, and a saturation magnetization (Bm) of about 70 to about 90 emu/gram; a process wherein the toner exhibits a magnetic signal of about 115 to about 150 percent of the nominal where the nominal is a signal strength of about 100 percent; a process wherein the toner possesses a minimum fix temperature (MFT) of about 170° C. to about 195° C.; a process wherein the toner hot offset temperature (HOT) is from about 210° C. to about 250° C.; a process wherein the magnetite dispersion is obtained by ball milling, attrition, polytroning or media milling with an anionic surfactant resulting in magnetite particles suspended in water containing an anionic surfactant; a process wherein the amount of the colorant dispersion is from about 4 to about 8 percent by weight of toner; a process wherein the noncrosslinked and the crosslinked latex contain resin particles of from about 0.15 to about 0.3 micron in volume average diameter; a process wherein the magnetite size is from about 0.6 micron in length to about 0.1 micron in average volume diameter, and the colorant size diameter is from about 0.05 to about 0.3 micron in average volume diameter; a process wherein coagulant is comprised of a mixture of polymetal halide and a cationic surfactant; a process wherein the base is selected from the group consisting of sodium hydroxide, potassium hydroxide, and ammonium hydroxide, and wherein the coagulant is a polymetal halide, a cationic surfactant, or a mixture thereof; a process wherein there is added to the formed toner aggregates a second latex comprised of submicron resin particles suspended in an aqueous phase containing an anionic surfactant, and wherein the second latex is selected in an amount of from about 10 to about 40 percent by weight of the initial noncrosslinked latex to form a shell thereover on the formed aggregates, and which shell is of an optional thickness of about 0.2 to about 0.8 micron wherein the coagulant is a polymetal halide and a cationic surfactant; a process wherein the added latex contains the same resin as the initial noncrosslinked latex, or wherein the added latex contains a dissimilar resin than that of the initial noncrosslinked latex; a process wherein the pH of the mixture resulting in (vi) is increased from about 2 to about 2.6 to about 6.5 to about 7.5, and wherein the base functions primarily as a stabilizer for the aggregates during coalescence (vii), and no or minimal toner particle size increase results, and wherein the coagulant is a polymetal halide, a cationic surfactant or a mixture thereof; a process wherein the temperature at which toner sized aggregates are formed controls the size of the aggregates, and wherein the final toner size is from about 2 to about 25 microns in volume average diameter; a process wherein the aggregation temperature is from about 45° C. to about 65° C., wherein the coalescence or fusion temperature is from about 80° C. to about 95° C., and wherein the coagulant is a polymetal halide; a process wherein the time of coalescence or fusion is from about 5 to about 12 hours, and wherein the toner resulting possesses a smooth morphology; a process wherein the latex contains a noncrosslinked resin or polymer selected from the group consisting of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile); a process wherein the noncrosslinked resin or polymer has a glass transition temperature (Tg) of about 45° C. to about 70° C.; a process wherein the noncrosslinked resin possesses a weight average molecular weight of about 20,000 to about 90,000; a process wherein the crosslinked latex contains a polymer selected from the group comprised of crosslinked, wherein the crosslinking percentage or value is, for example, from about 20 to about 75 percent, or about 25 to about 55, crosslinked poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile), and wherein the polymer in addition contains a crosslinking component, such as divinyl benzene (DVB), to enable the crosslinked resin or polymer, and wherein the crosslinking component can be selected in an amount of from about 0.1 to about 15 weight percent; a process wherein the polymer, in addition to DVB, can contain a carboxylic acid; and which carboxylic acid is, for example, selected from the group comprised of acrylic acid, methacrylic acid, itaconic acid, beta carboxy ethyl acrylate; and the like, and wherein the carboxylic acid is present in an amount of from about 0.5 to about 10 weight percent; a process comprising the heating of a magnetite dispersion, a colorant dispersion, a latex emulsion, a crosslinked polymer, and wherein the crosslinking is, for example, from about 30 to about 75 percent, and coagulants, wherein one of the coagulants is a polyaluminum chloride, or bromide, and a second coagulant of a cationic surfactant, such as an alkylbenzyl dimethyl ammonium chloride, and wherein the mixture is aggregated by heating below the latex resin glass transition temperature, followed by the addition of a base, and thereafter, heating above the latex resin glass transition temperature; a process wherein the aggregate mixture pH value is about 6.5 to about 7.5 obtained by the addition of a base like sodium hydroxide, and a process wherein the acicular magnetite possesses a coercivity of about 250 to about 700 Oe, a particle size of about 0.6 micron in length×0.1 micron in diameter; a toner containing a magnetite with a coercivity of from about 250 to about 500 Oe, a remanent magnetization (Br) of about 23 to 39 emu/gram, and a saturation magnetization (Bm) of about 70 to about 90 emu/gram; a magnetite with a coercivity of about 345 Oe, a remanent magnetization (Br) of about 35 emu/gram, and a saturation magnetization (Bm) of about 85 emu/gram; a magnetite with a coercivity of about 370 Oe, a remanent magnetization (Br) of about 33 emu/gram, and a saturation magnetization (Bm) of about 83 emu/gram; a magnetite with a coercivity of about 270 Oe, a remanent magnetization (Br) of about 20 emu/gram, and a saturation magnetization (Bm) of about 79 emu/gram; a magnetite with a coercivity of from about 250 to about 400 Oe, a remanent magnetization (Br) of about 23 to about 55 emu/gram, and a saturation magnetization (Bm) of about 70 to about 90 emu/gram; and wherein the acicular magnetite selected is present in the toner in an amount of from about 10 to about 40 weight percent; a process wherein the acicular magnetite possesses a coercivity of about 250 to about 700 Oe, a remanent magnetization (Br) of about 20 to about 40 emu/gram, and a saturation magnetization (Bm) of about 70 to about 90 emu/gram; a process wherein the magnetite is present in the toner in an amount of from about 50 to about 75 weight percent; a process wherein the magnetite is present in the toner in an amount of from about 55 to about 65 weight percent; a process wherein the coagulant is a polyaluminum chloride, and wherein the magnetite possesses an acicular shape; a process wherein the acicular magnetite possesses a coercivity of about 250 to about 700 Oe, a particle size in the range of about 0.6 micron in length×0.1 micron in diameter; a toner containing a magnetite with a coercivity of from about 250 to about 500 Oe, a remanent magnetization (Br) of about 23 to about 39 emu/gram, and a saturation magnetization (Bm) of about 70 to about 90 emu/gram; a process comprising heating a mixture of an acicular shaped magnetite dispersion, a black dispersion, a crosslinked latex resin, a noncrosslinked latex resin, and a dual coagulant, and wherein the heating involves a first heating and subsequently a second heating, and which second heating is at a higher temperature than the first heating; a process for the preparation of a toner comprising mixing a colorant dispersion comprising an acicular magnetite dispersion, a carbon black dispersion with a noncrosslinked latex emulsion, a crosslinked latex emulsion, a wax dispersion, and two coagulants of, for example, a polymetal halide and a cationic surfactant; a toner process wherein the dispersion comprises carbon black particles dispersed in water and a cationic surfactant; a process wherein the amount of acicular magnetite present is from about 18 to about 35 percent by weight of toner, the amount of polymetal halide present is about 0.02 to about 0.2 percent by weight of toner and the cationic surfactant coagulant amount is about 0.1 to about 2 weight percent by weight of toner; a process wherein the amount of acicular magnetite is from about 20 to about 30 percent by weight of toner and the amount of polymetal halide is about 0.05 to about 1 percent by weight of toner; a process wherein the acicular magnetite, which can be comprised of 21 percent FeO and 79 percent $Fe_2O_3$ is selected from the group consisting of B2510, B2540, B2550, HDM-S 7111 with a coercivity of from about 275 to about 500 Oe and a remanent magnetization (Br) of about 25 to about 39 emu/gram, and a saturation magnetization (Bm) of about 75 to about 90 emu/gram, all available from Magnox; MR-BL with a coercivity of about 340 Oe, a remanent magnetization (Br) of about 35 emu/gram, and a saturation magnetization (Bm) of about 85 emu/gram, all available from Titan Kogyo and Columbia Chemicals; MTA-740 with a coercivity of about 370 Oe, a remanent magnetization (Br) of about 35 emu/gram, and a saturation magnetization (Bm) of about 83 emu/gram, and all available from Toda Kogyo Inc.; AC 5151M with a coercivity of about 270 Oe, a remanent magnetization (Br) of 20 emu/gram, and a saturation magnetization (Bm) of 79 emu/gram, available from Bayer Corporation; MO4232, MO4431 with a coercivity of from about 250 to about 400 Oe, a remanent magnetization (Br) of about 23 to about 60 emu/gram, and a saturation magnetization (Bm) of about 70 to about 90 emu/gram, available from Elementis Inc.; wherein the toner exhibits a magnetic signal of from about 125 to about 150 percent of the nominal signal where nominal signal refers to the signal strength of 100 percent; a toner process wherein a second latex is selected in an amount of from about 10 to about 35 percent by weight of the initial latex (i) to form a shell thereover on the formed aggregates, and which shell is of a thickness of about 0.2 to about 1 micron; a process wherein the pH of the mixture resulting in (vi) is increased to about 6.5 to about 7.5, and wherein the added base functions primarily as a stabilizer for the aggregates during coalescence (vii), and no or minimal toner particle size or GSD increases result; a process wherein the aggregation (iv) temperature is from about 45° C. to about 70° C., and wherein the coalescence or fusion temperature of, for example, (vii) and (viii) is from about 85° C. to about 95° C.; a process wherein the time of coalescence or fusion is from about 10 to about 12 hours, and wherein the toner particles possess smooth morphology; a process wherein the crosslinked resin, with a crosslinking percentage of from about 10 to about 35, is selected from the group consisting of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), and poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile), crosslinked with known crosslinking compounds, such as divinyl benzene; a process wherein the crosslinking percentage or value is from about 30 to about 75 percent; a toner process wherein there is selected a polymetal silicate coagulant wherein the aggregate mixture is at a pH of from about 6.5 to about 7.5, and wherein the latex is comprised of resin, nonionic surfactant, ionic surfactant, and water; toner compositions prepared by (i) forming a noncrosslinked resin latex dispersion of a resin in an aqueous cationic surfactant solution from a latex utilizing an anionic surfactant; (ii) preparing a pigment dispersion of an acicular magnetite pigment dispersed in water and an anionic dispersant, adding a crosslinked resin, an anionic pigment dispersion of carbon black and a wax (iii) blending to form a resins magnetite carbon black/wax blend; (iv) adding a portion of a counterionic coagulant of polyaluminum chloride in an aqueous solution to the resins pigment wax blend, while continuously subjecting the mixture to high shear, to induce a homogeneous gel of the resin pigments wax crosslinked resin blend; (v) heating the sheared gel at temperatures below a glass transition temperature (Tg) of the resin while continuously stirring to form aggregate particles; (vi) subsequently, and after a period of time, for example, such as about 10 minutes to about 65 minutes, permitting stabilization of aggregate particle size followed by adding the remaining portion of the counterionic coagulant such as a cationic surfactant; (vii) stirring for a period of time, followed by adding the remaining portion, about 50 percent, of the total amount of resin latex dispersion to be added in the process; (viii) changing the pH of the slurry to greater than a pH of about 7 to stabilize the toner particle growth, (ix) then heating the aggregate particles at temperatures above the Tg of the resin, followed by reducing the pH to about 5.5 in stages over a period of, for example, about 60 to about 120 minutes, and further heating the mixture for a period of about 7 to about 12 hours to form coalesced particles of a toner composition; and (ix) separating and drying the toner composition; a toner process as illustrated herein wherein the amount of resin free of crosslinking is from about 40 to about 65 weight percent; the amount of crosslinked resin is from about 2 to about 15 weight percent; the amount of magnetite is from about 20 to about 35 weight percent; the colorant amount is from about 4 to about 10 weight percent; and the wax amount is from about 5 to about 15 weight percent; and the total of the components is 100 percent; a process for preparing a chemical toner wherein the blending and aggregation are performed at a pH of about 2 to about 3 or about 2 to about 2.8, while the coalescence is initially conducted at a pH of about 7 to about 8 followed by a reduction in pH to about 5.5 to about 6.5, and followed by further heating for a period of hours, for example, about 6 to about 12 hours; and a process for preparing a MICR toner composition by emulsion aggregation, which toner possesses a smooth shape and feel, and contains from about 20 to about 40 weight percent of an acicular magnetite, wax, crosslinked resin, and colorant, and with a toner particle size distribution in the range of about 1.20 to about 1.26, and providing a MICR signal of about 90 to about 140 percent and a bulk remanence of about 26 emu/gram wherein the remanence can be measured on a tapped powder magnetite sample in a cell of 1 centimeter×1 centimeter×about 4 centimeters. The sample is magnetized between two magnetic pole faces with a saturating magnetic field of 2,000 Gauss, such that the induced magnetic field is perpendicular to one of the 1×4 centimeter faces of the cell. The sample is removed from the saturating magnetic field, and the remanence is measured perpendicular to the above 1 centimeter wide face using a Hall-Effect device or a gaussmeter, such as the F.W. Bell, Inc. Model 615 gaussmeter.

Illustrative examples of resin particles selected for the process of the present invention include known polymers selected, for example, from the group consisting of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylononitrile), polymers containing carboxylic acid; wherein the carboxylic acid is, for example, selected from a group of acrylic acid, methacrylic acid, itaconic acid, or beta carboxy ethyl acrylate.

The resin particles selected for the process of the present invention can be prepared by, for example, emulsion polymerization techniques, including semicontinuous emulsion polymerization methods, and the monomers utilized in such processes can be selected from, for example, styrene, acrylates, methacrylates, butadiene, isoprene, acrylonitrile; monomers comprised of an A and a B monomer wherein from about 75 to about 95 percent of A and from about 5 to about 30 percent of B is selected, wherein A can be, for example, styrene, and B can be, for example, an acrylate, methacrylate, butadiene, isoprene, or an acrylonitrile; and optionally, acid or basic olefinic monomers, such as acrylic acid, methacrylic acid, beta carboxy ethyl acrylate, acrylamide, methacrylamide, quaternary ammonium halide of dialkyl or trialkyl acrylamides or methacrylamide, vinylpyridine, vinylpyrrolidone, vinyl-N-methylpyridinium chloride and the like. The presence of acid or basic groups in the monomer or polymer resin is optional, and such groups can be present in various amounts of from about 0.1 to about 10 percent by weight of the polymer resin. Chain transfer agents, such as dodecanethiol or carbon tetrabromide, can also be selected when preparing resin particles by emulsion polymerization. Other processes of obtaining resin particles of, for example, from about 0.01 micron to about 1 micron can be selected from polymer microsuspension process, such as those illustrated in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding process, or other known processes; and toner processes wherein the resin possesses a crosslinking percentage of from about 1 to about 50 and/or from about 1.5 to about 30.

Colorants include dyes, pigments, and mixtures thereof, colorant examples being illustrated in a number of the copending applications referenced herein, and more specifically, which colorants include known colorants like black, cyan, red, blue, magenta, green, brown, yellow, mixtures thereof, and the like.

Crosslinked resin examples with crosslinking values as illustrated herein, and more specifically, of, for example, from about 25 to about 80, and more specifically, from about 30 to about 65 percent, and which resins are selected in various amounts, such as from about 1 to about 20, and more specifically, from about 5 to about 10 weight percent based on the weight percentages of the remaining toner components, include the resins illustrated herein, which resins are crosslinked by known crosslinking compounds, such as divinyl benzene. Specific crosslinked resin examples are poly(styrene divinyl benzene beta CEA), poly(styrene butyl acrylate divinyl benzene beta CEA), poly(styrene divinyl benzene acrylic acid), poly(styrene butyl acrylate divinyl benzene acrylic acid), and the like.

Examples of anionic surfactants include, for example, sodium dodecylsulfate (SDS), sodium dodecylbenzene sulfonate, sodium dodecyinaphthalene sulfate, dialkyl benzenealkyl, sulfates and sulfonates, abitic acid, available from Aldrich, NEOGEN RK™, NEOGEN SC™ from Kao and the like. An effective concentration of the anionic surfactant generally employed is, for example, from about 0.01 to about 10 percent by weight, and preferably from about 0.1 to about 5 percent by weight of monomers used to prepare the toner polymer resin.

Examples of nonionic surfactants that may be, for example, included in the resin latex dispersion include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy)ethanol, available from Rhodia as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®. A suitable concentration of the nonionic surfactant is, for example, from about 0.01 to about 10 percent by weight, and preferably from about 0.1 to about 5 percent by weight of monomers used to prepare the toner polymer resin.

Examples of the cationic surfactants, which are usually positively charged, selected for the toners and processes of the present invention include, for example, alkylbenzyl dimethyl ammonium chloride dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof. A suitable amount of surfactant can be selected, such as from about 0.2 to about 5 percent by weight of the toner components.

Counterionic coagulants may be comprised of organic, or inorganic entities and the like. For example, in embodiments the ionic surfactant of the resin latex dispersion can be an anionic surfactant, and the counterionic coagulant can be a polymetal halide or a polymetal sulfo silicate (PASS). Coagulants that can be included in the toner in amounts of, for example, from about 0.05 to about 10 weight percent include polymetal halides, polymetal sulfosilicates monovalent, divalent or multivalent salts optionally in combination with cationic surfactants, and the like. Inorganic cationic coagulants include, for example, polyaluminum chloride (PAC), polyaluminum sulfo silicate (PASS), aluminum sulfate, zinc sulfate, or magnesium sulfate.

Examples of dispersants that can be suitable for dispersing the magnetite pigment particles included functional copolymers, such as for example methyl vinyl ether-maleic acid, methyl vinyl ethermaleic acid calcium sodium salt, hydrophobically modified polyethers, polyvinylpyrrolidone homopolymers, alkylated vinylpyrrolidone copolymers, vinyl acetate/vinylpyrrolidone copolymers, vinylpyrrolidone/styrene block, poly(methyl vinyl ether/maleic anhydride) (linear interpolymer with 1:1 molar ratio), dimethylaminoethyl methacrylate, ethylene-vinyl acetate copolymer of maleic anhydride and acrylic acid, polystyrene-maleic anhydride, styrene-acrylic ester, ethyl acrylate/methyl methacrylate, carboxylated poly-n-butyl acrylates, and ethylene vinyl alcohol, and which, for example, permit the magnetite to be readily dispersible into a submicron particle size of, for example, about 30 to about 400 nanometers in either an acid or a base resulting in a magnetite pigment that can be stabilized by resin particles.

The solids content of the resin latex dispersion is not particularly limited, thus the solids content may be from, for example, about 10 to about 90 percent. With regard to the colorants, such as carbon black, in some instances they are available in the wet cake or concentrated form containing water, and can be easily dispersed utilizing a homogenizer or simply by stirring or ball milling, attrition, or media milling. In other instances, pigments are available only in a dry form whereby dispersion in water is effected by microfluidizing using, for example, a M-110 microfluidizer or an ultimizer, and passing the pigment dispersion from about 1 to about 10 times through a chamber by sonication, such as using a Branson 700 sonicator, with a homogenizer, ball milling, attrition, or media milling with the optional addition of dispersing agents such as the aforementioned ionic or nonionic surfactants.

Acicular magnetite examples are as illustrated herein, such as those with a composition of about 21 percent FeO and about 79 percent $Fe_2O_3$ which usually possess a coercivity of about 250 to about 700 Oe with a particle size in the range of about 0.6 micron in length×0.1 micron in diameter; B2510, B2540, B2550, HDM-S 7111 whose coercivity is from about 250 to about 500 Oe, its remanent magnetization (Br) is about 23 to about 39 emu/gram, and its saturation magnetization (Bm) is about 70 to about 90 emu/gram, available from Magnox Inc.; MR-BL whose coercivity is about 345 Oe with a remanent magnetization (Br) of about 35 emu/gram, and a saturation magnetization (Bm) of about 85 emu/gram, available from Titan Kogyo and Columbia Chemicals; MTA-740 whose coercivity is 370 Oe with a remanent magnetization (Br) of about 33 emu/gram, and a saturation magnetization (Bm) of about 83 emu/gram, available from Toda Kogyo Inc.; AC 5151M whose coercivity is 270 Oe with a remanent magnetization (Br) of about 20 emu/gram, and a saturation magnetization (Bm) of about 79 emu/gram, available from Bayer Corporation; and MO8029, MO4232, MO4431 whose coercivity is from about 250 to about 400 Oe with a remanent magnetization (Br) of about 23 to about 55 emu/gram, and a saturation magnetization (Bm) of about 70 to about 90 emu/gram, available from Elementis Inc. The acicular magnetite selected is present in the toner in an amount, for example, of from about 10 to about 35 weight percent, and more specifically, in an amount of about 22 to about 32 weight percent by weight of toner. In embodiments, cubic shaped magnetites may perhaps be selected.

Emulsion aggregation processes for the preparation of chemical toners include the utilization of an ionic coagulant having an opposite polarity to the ionic surfactant in the latex (i.e., a counterionic coagulant), typically a cationic coagulant, to ensure that the latex containing the ionic surfactant, and anionic surfactant is aggregated into toner particles. The quantity of coagulant present to, for example, prevent/minimize the appearance of fines in the final slurry; fines refer to small sized particles of less than about 1 micron in average volume diameter, which fines can adversely affect toner yield.

The coagulant is in embodiments present in an aqueous medium in an amount of from, for example, about 0.05 to about 10 percent by weight, and more specifically, in an amount of from about 0.075 to about 2 percent by weight. The coagulant may also contain minor amounts of other components, for example nitric acid. The coagulant is usually added slowly into the blend while continuously subjecting the blend to high shear, for example, by stirring with a blade at about 3,000 to about 10,000 rpm, and preferably about 5,000 rpm, for about 1 to about 120 minutes. A high shearing device, for example an intense homogenization device, such as the in-line IKA SD-41, may be used to ensure that the blend is homogeneous and uniformly dispersed.

After aggregation, the resulting particles are coalesced by, for example, first changing the pH to about 6 to about 8, followed by heating at a temperature above the Tg of the latex resin in the toner particles. The heating for coalescing can in embodiments be conducted at a temperature of from about 10° C. to about 50° C., or from about 25° C. to about 40° C. above the Tg of the resin for a suitable period, such as for example, about 30 minutes to about 10 hours.

During the coalescence, the pH is increased, for example, from about 2 to about 3 to about 6 to about 8, from about 2 to about 2.8 to about 6.5 to about 7.8 by the addition of a suitable pH increasing agent of, for example, sodium hydroxide. The increase in pH assists in stabilizing the aggregate particles and prevents/minimizes toner size growth and loss of GSD during further heating, for example, raising the temperature about 10° C. to about 50° C. above the resin Tg. The reduction in pH during the coalescence for the fusion of the aggregates can be accomplished by using an acid. Examples of pH reducing agents include, for example, nitric acid, citric acid, sulfuric acid or hydrochloric acid, and the like.

In embodiments of the present invention, a multi-stage addition of latex is conducted. In particular, a portion, for example about 20 to about 40 percent of the total amount of latex, is retained while the remainder is subjected to homogenization and aggregation. In these embodiments, a majority of the latex is added at the onset while the remainder of the latex (the delayed latex) is added after the formation of the resin aggregates. This delayed addition of the second or additional latex provides in embodiments an outer shell of nonpigmented material around the magnetite/colorant core, thereby encapsulating the pigment in the core of the particles and away from the toner particle surface.

In embodiments, with the processes illustrated herein toner particles of acceptable size and narrow dispersity can be obtained in a more rapid method. The obtained toner particles possess, for example, an average volume diameter of from about 0.5 to about 25, and more specifically, from about 1 to about 10 microns, and narrow GSD characteristics of, for example, from about 1.05 to about 1.25, or from about 1.15 to about 1.25 as measured by a Coulter Counter. The toner particles also possess an excellent shape factor, for example, of 120 or less wherein the shape factor refers, for example, to the measure of toner smoothness and toner roundness, where a shape factor of about 100 is considered spherical and smooth without any surface protrusions, while a shape factor of about 145 is considered to be rough in surface morphology and the shape is like a potato.

The toner particles illustrated herein may also include known charge additives in effective amounts of, for example, from 0.1 to 5 weight percent such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and the like. Surface additives that can be added to the toner compositions after washing or drying include, for example, metal salts, metal salts of fatty acids, colloidal silicas, metal oxides, mixtures thereof and the like, which additives are usually present in an amount of from about 0.1 to about 2 weight percent, reference U.S. Pat. Nos. 3,590,000; 3,720,617; 3;655,374 and 3,983,045, the disclosures of which are totally incorporated herein by reference. Specific additives include zinc stearate and AEROSIL R972® available from Degussa Chemical and present in an amount of from about 0.1 to about 2 percent which can be added during the aggregation process or blended into the formed toner product.

Developer compositions can be prepared by mixing the toners obtained with the process of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

The following Examples are provided. Parts and percentages are by weight unless otherwise indicated and temperatures are in degrees Centigrade.

EXAMPLES

Preparation of Noncrosslinked Latex A

A latex emulsion (i) comprised of polymer particles generated from the emulsion polymerization of styrene, butyl acrylate and beta carboxy ethyl acrylate (Beta CEA) was prepared as follows. A surfactant solution of 434 grams of DOWFAX 2A1™ (anionic emulsifier—55 percent active ingredients) and 387 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while being stirred at 100 RPM. The reactor was then heated to 80° C.

Separately, 6.11 kilograms of ammonium persulfate initiator were dissolved in 30.2 kilograms of deionized water. Also, separately a monomer emulsion A was prepared in the following manner. 315.7 Kilograms of styrene, 91.66 kilograms of butyl acrylate, 12.21 kilograms of beta-CEA, 7.13 kilograms of 1-dodecanethiol, 1.42 kilograms of decanediol diacrylate (ADOD), 8.24 kilograms of DOWFAX™ (anionic surfactant), and 193 kilograms of deionized water were mixed to form an emulsion. Five percent of the above emulsion was then slowly fed into the reactor containing the aqueous surfactant phase at 80° C. to form seeds wherein "seeds" refer, for example, to the initial emulsion latex added to the reactor prior to the addition of the initiator solution, while being purged with nitrogen. The above initiator solution was then slowly charged into the reactor forming about 5 to about 12 nanometers of latex "seed" particles. After 10 minutes, the remainder of the emulsion was continuously fed in using metering pumps.

After the above monomer emulsion was charged into the main reactor, the temperature was maintained at 8° C. for an additional 2 hours to complete the reaction. The reactor contents were then cooled down to about 25° C. The resulting isolated product was comprised of 40 weight percent of submicron, 0.5 micron diameter resin particles of styrene/butylacrylate/betaCEA suspended in an aqueous phase containing the above surfactant. The molecular properties resulting for the resin latex were $M_w$ (weight average molecular weight) of 39,000, $M_n$ of 10.8, as measured by a Gel Permeation Chromatograph, and a midpoint Tg of 55.8° C., as measured by a Differential Scanning Calorimeter, where the midpoint Tg is the halfway point between the onset and the offset Tg of the polymer.

Preparation of the Crosslinked Latex B (100 Nanometers)

A crosslinked latex emulsion comprised of polymer particles generated from the emulsion polymerization of styrene, butyl acrylate and beta carboxy ethyl acrylate (β)CEA was prepared as follows. A surfactant solution of 120 grams of DOWFAX™ 2A1 (anionic emulsifier—55 percent) and 10 kilograms of deionized water was prepared by mixing for 10 minutes in a stainless steel holding tank. The holding tank was then purged with nitrogen for 5 minutes before transferring the mixture resulting into the reactor. The reactor was then continuously purged with nitrogen while the reactor contents were being stirred at 100 RPM. The reactor was then heated to 76° C., and held there for a period of 1 hour.

Separately, 162 grams of ammonium persulfate initiator were dissolved in 900 grams of deionized water.

Also separately, a monomer emulsion was prepared in the following manner. Seven (7) kilograms of styrene, 3.78 kilograms of butyl acrylate, 324 grams of β-CEA, 108 grams of divinyl benzene (DVB), 188 grams of DOWFAX™ (anionic surfactant), and 4.6 kilograms of deionized water were mixed to form an emulsion. 1 Percent of the above emulsion was then slowly fed into the reactor while being purged with nitrogen containing the aqueous surfactant phase at 76° C. to form "seeds". The initiator solution was then slowly charged into the reactor, and after 40 minutes the remainder of the emulsion was continuously fed in using metering pumps over a period of 3 hours.

Once all the monomer emulsion was charged into the main reactor, the temperature was held at 76° C. for an additional 4 hours to complete the reaction. Full cooling was then applied and the reactor temperature was reduced to 35° C. The resulting product was then collected into a holding tank. After drying the latex, the resin latex onset Tg was 53.5° C. The latex was comprised of 40 percent crosslinked resin, 58.5 percent water and 1.5 percent anionic surfactant. The resin ratio was 65:35:3 pph:1 pph of styrene:butyl acrylate:β-CEA:DVB. The mean particle size of the resin gel (crosslinked resin) latex was 110 nanometers as measured on a disc centrifuge.

Preparation of the Crosslinked Latex C (50 Nanometers)

A crosslinked latex emulsion comprised of polymer particles generated from the emulsion polymerization of styrene, butyl acrylate and beta carboxy ethyl acrylate (β)CEA was prepared as follows. A surfactant solution of 4.08 kilograms of NEOGEN™ RK (anionic emulsifier) and 78.73 kilograms of deionized water was prepared by mixing these components for 10 minutes in a stainless steel holding tank. The holding tank was then purged with nitrogen for 5 minutes before transferring the resulting mixture into the above reactor. The reactor was then continuously purged with nitrogen while the contents were being stirred at 100 RPM. The reactor was then heated up to 76° C., and held there for a period of 1 hour.

Separately, 1.24 kilograms of ammonium persulfate initiator was dissolved in 13.12 kilograms of deionized water.

Also separately, the monomer emulsion was prepared in the following manner. 47.39 Kilograms of styrene, 25.52 kilograms of butyl acrylate, 2.19 kilograms of β-CEA, 0.729 kilogram of divinyl benzene (DVB) crosslinking agent, 1.75 kilograms of NEOGEN™ RK (anionic surfactant), and 145.8 kilograms of deionized water were mixed to form an emulsion. One (1) percent of the emulsion was then slowly fed into the reactor, while being purged with nitrogen, containing the aqueous surfactant phase at 76° C. to form "seeds". The initiator solution was then slowly charged into the reactor and after 40 minutes the remainder of the emulsion was continuously fed in using metering pumps over a period of 3 hours.

Once all the monomer emulsion was charged into the above main reactor, the temperature was held at 76° C. for an additional 4 hours to complete the reaction. Cooling was then accomplished and the reactor temperature was reduced to 35° C. The product was collected into a holding tank. After drying, the resin latex onset Tg was 53.5° C. The resulting latex was comprised of 25 percent resin, 72.5 percent water and 2.5 percent anionic surfactant. The resin had a ratio of 65:35:3 pph:1 pph of styrene:butyl acrylate:β-CEA:DVB. The mean particle size of the gel latex was 50 nanometers as measured on the disc centrifuge. Total output was 320.55 kilograms.

Wax and Pigment Dispersions

The aqueous wax dispersion utilized in the following Examples was generated using waxes available from Baker-Petrolite; (1) P725 polyethylene wax with a low molecular weight $M_w$ of 725, and a melting point of 104° C., or (2) P850 wax with a low molecular weight of 850 and a melting point of 107° C. and NEOGEN RK™ as an anionic surfactant/dispersant. The wax particle diameter size was determined to be approximately 200 nanometers, and the wax slurry was a solid loading of 30 percent (weight percent throughout).

The pigment dispersion, obtained from Sun Chemicals, was an aqueous dispersion containing carbon black (REGAL 330®), an anionic surfactant, 2 percent, and 79 percent water.

EXAMPLE I
(30 Percent Acicular Magnetite) Sani-PAC Coagulant (0.26:0.075 pph)

95 Grams of MAGNOX B2550™ acicular magnetite comprised of 21 percent FeO and 79 percent $Fe_2O_3$ having a particle size of about 0.6 micron×0.1 micron were added to 600 grams of water containing 1.3 grams of 20 percent aqueous anionic surfactant (NEOGEN RK™) to which 82.5 grams of the above 19 percent carbon black solution were added. The resultant mixture was then polytroned or homogenized for a period of 3 minutes at speeds of 5,000 rpm to provide a pigment dispersion. To the resulting pigment dispersion were added 90 grams of a dispersion of the above submicron polyethylene P850 wax particles (30 percent solids) followed by the addition of 285 grams of the above prepared anionic Latex A comprising submicron latex particles (40 percent solids) of styrene/butylacrylate/beta CEA, and 37.5 grams of the crosslinked Latex B of styrene/butylacrylate/divinyl benzene beta CEA (40 percent solids) and then polytroned at speed of 5,000 rpm for a period of 5 minutes. 300 Grams of water were then added to reduce the viscosity of the resulting blend to which then was added an aqueous PAC coagulant solution comprising 2.25 grams of 10 percent solids placed in 23 grams of 0.3 M nitric acid.

The resulting blend was then heated to a temperature of 50° C. while stirring for a period of 30 minutes to obtain a particle size of 5.4 with a GSD of 1.26. To this was added a cationic surfactant of 1.6 grams of alkylbenzyl dimethyl ammonium chloride—SANIZOL B™ (50 percent solids), dissolved in 15 grams of water. After 90 minutes, toner size aggregates of 5.9 microns with a GSD of 1.21 resulted. 120 Grams of the above noncrosslinked latex were then added to the aggregate mixture and stirred at 50° C. for an additional 30 minutes to provide a particle size of 6.5 and a GSD of 1.20. The aggregate mixture was then stabilized from further growth by changing the pH of the mixture from about 2.6 to about 7.3 with an aqueous solution of 4 percent sodium hydroxide. The resulting mixture was then heated to 93° C. during which the pH was at between about 7.2 to about 7.4 with the addition of aqueous 4 percent sodium hydroxide solution. After 1 hour at 93° C., the pH was reduced in stages of 6.5 followed by 5.7 after an additional 30 minutes to an aqueous 1.25 percent of nitric acid solution. After a period of 6 hours at 93° C., the particle size measured was 6.8 microns with a GSD of 1.22. The resultant mixture was cooled and the toner obtained was washed 4 times with water and dried on a freeze dryer. The resulting toner was comprised of 30 percent magnetite, 5 percent of the crosslinked resin, 4.5 percent carbon black, and 8.5 percent wax, and which toner provided a magnetite signal of 116 percent of nominal at a TMA of 0.8 $\mu g/cm^2$. The toner when fused in a Xerox Corporation DC 265 xerographic engine had a MFT of 185° C. and a HOT offset temperature greater than 210° C., that is there was no toner offsetting at 210° C.

EXAMPLE II
Sani-PAC (0.33:0.075 pph)

95 Grams of MAGNOX B2550™ acicular magnetite comprised of 21 percent FeO and 79 percent $Fe_2O_3$, and with a particle size diameter of about 0.6 micron×0.1 micron were added to 600 grams of water containing 1.3 grams of a 20 percent aqueous anionic surfactant (NEOGEN RK™) to which 82.5 grams of the above 19 percent carbon black solution were added. The resultant mixture was then polytroned or homogenized for a period of 3 minutes at speeds of 5,000 rpm to provide a pigment dispersion. To the resulting pigment dispersion were added 90 grams of a dispersion of submicron polyethylene P850 wax particles (30 percent solids) followed by the addition of 285 grams of an anionic Latex A comprising submicron latex particles (40 percent solids) of styrene/butylacrylate/beta CEA, and 37.5 grams of the above prepared crosslinked Latex B of styrene/butylacrylate/divinyl benzene beta CEA (40 percent solids) while being polytroned at a speed of 5,000 rpm for a period of 5 minutes. 300 Grams of water were then added to reduce the viscosity of the resulting blend to which then was added an aqueous PAC coagulant solution comprising 2.25 grams of 10 percent solids placed in 23 grams 0.3 M nitric acid.

The resulting blend was then heated to a temperature of 50° C. while stirring the mixture for a period of 30 minutes to obtain a particle size of 5.6 with a GSD of 1.26. To this were added 2.1 grams of a cationic surfactant of alkylbenzyl dimethyl ammonium chloride—SANIZOL B™ (50 percent solids) dissolved in 15 grams of water. After 90 minutes, toner size aggregates of 6.2 microns with a GSD of 1.20 resulted. 120 Grams of the above prepared noncrosslinked latex were then added to the aggregate mixture and stirred at 50° C. for an additional 30 minutes to provide a particle size of 6.7 and a GSD of 1.20. The aggregate mixture was then stabilized from further growth by changing the pH of the mixture from about 2.6 to about 7.3 with an aqueous solution of 4 percent sodium hydroxide. The mixture was then heated to 93° C. during which the pH was maintained between about 7.1 to about 7.4 with the addition of an aqueous 4 percent sodium hydroxide. After 1 hour at 93° C., the pH was reduced in stages, for example 6.5 followed by to 5.7 after an additional 30 minutes with an aqueous 1.25 percent nitric acid solution. After a period of 6 hours at 93° C., the particle size measured was 7 microns with a GSD of 1.22. The resultant mixture was cooled and the toner obtained was washed 4 times with water and dried on the freeze dryer. The resulting toner was comprised of 30 percent magnetite, 5 percent of crosslinked resin, 4.5 percent carbon black, 52 percent of noncrosslinked resin, 8.5 percent wax and produced a magnetite signal of 120 percent of nominal at a TMA of 0.8 $\mu g/cm^2$. The toner when fused in a Xerox Corporation DC 265 xerographic engine had a MFT of 183° C. and a HOT offset temperature of about 210° C., that is no toner offsetting at 210° C.

EXAMPLE III

Sani-PAC (0.26:0.075 pph) with 50 Nanometers of Gel

95 Grams of MAGNOX B2550™ acicular magnetite composed of 21 percent FeO and 79 percent $Fe_2O_3$ having a particle size of about 0.6 micron×0.1 micron were added to 600 grams of water containing 1.3 grams of 20 percent aqueous anionic surfactant (NEOGEN RK™) to which 82.5 grams of the above 19 percent carbon black solution were added. The resultant mixture was then polytroned or homogenized for a period of 3 minutes at speeds of 5,000 rpm to provide a pigment dispersion. To the resulting pigment dispersion were added 90 grams of a dispersion of submicron polyethylene P850 wax particles (30 percent solids) followed by the addition of 285 grams of an anionic Latex A comprising submicron latex particles (40 percent solids) of styrene/butylacrylate/beta CEA, and 64 grams of the above crosslinked Latex C containing styrene/butylacrylate/divinyl benzene beta CEA (25 percent solids) while being polytroned at a speed of 5,000 rpm for a period of 5 minutes. 300 Grams of water were then added to reduce the viscosity of the resulting blend to which then was added an aqueous PAC coagulant solution comprising 2.25 grams of 10 percent solids placed in 23 grams of 0.3 M nitric acid.

The resulting blend was then heated to a temperature of 50° C. while stirring for a period of 30 minutes to obtain a particle size diameter of 5.5 with a GSD of 1.21. To this was added a cationic surfactant of 1.6 grams of alkylbenzyl dimethyl ammonium chloride—SANIZOL B™ (50 percent solids) dissolved in 15 grams of water. After 90 minutes, toner size aggregates of 5.8 microns with a GSD of 1.21 resulted. 120 Grams of the above noncrosslinked latex were then added to the aggregate mixture and stirred at 48° C. for an additional 30 minutes to provide a particle size of 6 and a GSD of 1.20. The aggregate mixture was then stabilized from further growth by changing the pH of the mixture from about 2.6 to about 7.3 with an aqueous solution of 4 percent sodium hydroxide. The mixture was then heated to 93° C. during which the pH was maintained between about 7.2 to about 7.4 with the addition of aqueous 4 percent sodium hydroxide solution. After 1 hour at 93° C., the pH was reduced in stages from, for example 6.5 followed by to 5.7 after an additional 30 minutes with an aqueous 1.25 percent of nitric acid solution. After a period of 6 hours at 93° C., the particle size measured was 6.4 microns with a GSD of 1.22. The resultant mixture was cooled and the toner obtained was washed 4 times with water and dried on a freeze dryer. The resulting toner was comprised of 30 percent magnetite, 5 percent of crosslinked resin, 52 percent of noncrosslinked resin, 4.5 percent carbon black and 8.5 percent wax, and which toner provided a magnetite signal of 125 percent of nominal at a TMA of 0.8 $\mu gram/cm^2$. The toner when fused in a Xerox Corporation DC 265 xerographic engine had MFT of 187° C. and a HOT offset temperature greater than 210° C.

EXAMPLE IV

SANIZOL™ (0.42 pph)

95 Grams of Magnox B2550™ acicular magnetite composed of 21 percent FeO and 79 percent $Fe_2O_3$, and with a particle size diameter of about 0.6 micron×0.1 micron were added to 600 grams of water containing 1.3 grams of a 20 percent aqueous anionic surfactant (NEOGEN RK™) to which 82.5 grams of the above 19 percent carbon black solution were added. The resultant mixture was then polytroned or homogenized for a period of 3 minutes at speeds of 5,000 rpm to provide a pigment dispersion. To the resulting pigment dispersion were added 90 grams of a dispersion of submicron polyethylene P850 wax particles (30 percent solids) followed by the addition of 285 grams of the anionic Latex A comprising submicron resin latex particles (40 percent solids) of styrene/butylacrylate/beta CEA, and 37.5 grams of the crosslinked Latex B of styrene/butylacrylate/divinyl benzene beta CEA (40 percent solids) while polytroned at a speed of 5,000 rpm for a period of 5 minutes. 300 Grams of water were added to reduce the viscosity of the resulting blend to which then was added the first half of the cationic coagulant of an aqueous alkylbenzyl dimethyl ammonium chloride (SANIZOL B™) solution comprising 2.6 grams of 60 percent active ingredients placed in 23 grams of deionized water. The resulting blend was then heated to a temperature of 50° C. while stirring for a period of 30 minutes to obtain a particle size of 5.45 with a GSD of 1.24. To this was added the remaining 50 percent of the cationic coagulant surfactant solution prepared above. After 90 minutes, toner size aggregates of 6.1 microns with a GSD of 1.21 resulted. 120 Grams of the above noncrosslinked Latex A were then added to the aggregate mixture and stirred at 50° C. for an additional 30 minutes to provide a particle size of 6.4 and a GSD of 1.20. The aggregate mixture was then stabilized from further growth by changing the pH of the mixture from about 2.6 to about 7.3 with an aqueous solution of 4 percent sodium hydroxide. The mixture was then heated to 93° C. during which the pH was maintained between about 7.2 to about 7.4 with the addition of aqueous 4 percent sodium hydroxide solution. After 1 hour at 93° C., the pH was reduced in stages first to 6.5 then to 5.7 after an additional 30 minutes with an aqueous 1.25 percent nitric acid solution. After a period of 6 hours at 93° C., the toner particle size diameter was 6.8 microns with a GSD of 1.22. The resultant mixture was cooled and the toner obtained was washed 4 times with water and dried on a freeze dryer. The resulting toner was comprised of 30 percent magnetite, 52 percent of crosslinked resin, 4.5 percent carbon black, 52 percent of noncrosslinked resin, and 8.5 percent wax, and which toner provided a magnetite signal of 124 percent of nominal at a TMA of 0.8 $\mu gram/cm^2$. The toner when fused in a Xerox Corporation DC 265 xerographic engine had MFT of 190° C. and a HOT offset temperature greater than 210° C., that is about 225° C.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A toner process comprising heating a colorant dispersion comprising an acicular magnetite dispersion and a colorant with a latex containing a crosslinked resin, a latex containing a resin free of crosslinking, a wax dispersion, a resin, and a coagulant, and wherein said heating comprises a first heating below about the glass transition temperature of said resin, and subsequently heating above about the glass transition temperature of said resin.

2. A process in accordance with claim 1 wherein
   (i) said magnetite dispersion contains water and an anionic surfactant, said colorant dispersion contains water and an anionic surfactant, and said wax dispersion is comprised of submicron wax particles of from about 0.1 to about 0.5 micron in diameter by volume, and which wax is dispersed in an anionic surfactant;
   (ii) wherein the latex is comprised of two emulsions, a noncrosslinked latex and a crosslinked latex, and wherein said latexes contain resin particles, water and an anionic surfactant;
   (iii) adding to the resulting mixture with a pH of about 2 to about 2.9 said coagulant, and which coagulant is a polymetal halide, a cationic surfactant, or mixtures thereof to primarily enable flocculation of said resin latexes, said magnetite, said colorant, and said wax;
   (iv) heating the resulting mixture below about the glass transition temperature (Tg) of the latex resin to form toner sized aggregates;
   (v) adding to the formed toner aggregates a second latex comprised of resin suspended in an aqueous phase containing an ionic surfactant and water;
   (vi) adding to the resulting mixture a base to thereby change the pH from an initial pH of about 2 to about 2.9 to a pH of from about 7 to about 8;
   (vii) heating the resulting aggregate suspension of (vi) to about the Tg of the latex resin of (i);
   (viii) optionally retaining the mixture temperature at from about 70° C. to about 95° C. optionally for a period of about 10 to about 60 minutes, followed by a pH reduction with an acid to arrive at a pH of about 5, to about 6 to assist in permitting the fusion or coalescence of the toner aggregates;
   (ix) further retaining the mixture temperature at from about 85° C. to about 95° C. for an optional period of about 6 to about 12 hours to assist in permitting the fusion or coalescence of the toner aggregates and to obtain smooth particles; and
   (x) washing the resulting toner slurry; and isolating the toner.

3. A process in accordance with claim 1 wherein said colorant dispersion contains an anionic surfactant.

4. A process in accordance with claim 1 wherein said colorant is carbon black, and wherein said carbon black dispersion comprises carbon black particles dispersed in water and an anionic surfactant, and wherein said colorant is present in an amount of from about 4 to about 10 weight percent.

5. A process in accordance with claim 1 wherein the amount of acicular magnetite selected is from about 20 to about 40 percent by weight of toner, and said coagulant is comprised of a first coagulant of a polymetal halide present in an amount of about 0.02 to about 2 percent by weight of toner, and a further second cationic surfactant coagulant present in an amount of about 0.1 to about 5 percent by weight of toner.

6. A process in accordance with claim 1 wherein the amount of acicular magnetite selected is from about 23 to about 35 percent by weight of toner, and the amount of coagulant, which coagulant is a polymetal halide, is selected in an amount of about 0.05 to about 0.15 percent by weight of toner.

7. A process in accordance with claim 1 wherein the acicular magnetite utilized exhibits a coercivity of from about 250 to about 700 Oe.

8. A process in accordance with claim 1 wherein said acicular magnetite possesses a coercivity of from about 250 to about 500 Oe, a remanent magnetization (Br) of about 23 to about 39 emu/gram, and a saturation magnetization (Bm) of about 70 to about 90 emu/gram.

9. A process in accordance with claim 1 wherein the toner possesses a minimum fix temperature (MFT) of about 170° C. to about 195° C.

10. A process in accordance with claim 1 wherein the magnetite dispersion is obtained by ball milling, attrition, polytroning or media milling with an anionic surfactant resulting in magnetite particles suspended in water containing said anionic surfactant.

11. A process in accordance with claim 1 wherein said colorant is carbon black, and the amount of said carbon black dispersion is from about 3 to about 10 percent by weight of toner.

12. A process in accordance with claim 1 wherein the crosslinked resin contains resin particles of from about 0.15 to about 0.4 micron in volume average diameter, and said latex contains a resin free of crosslinking.

13. A process in accordance with claim 1 wherein the magnetite size is from about 0.6 micron to about 0.1 micron in average volume diameter, and said colorant is carbon black, and said carbon black is from about 0.01 to about 0.2 micron in average volume diameter.

14. A process in accordance with claim 2 wherein said acid is nitric, sulfuric, hydrochloric, citric or acetic acid, and said coagulant is comprised of a first coagulant of a polyaluminum chloride and a second coagulant of a cationic surfactant.

15. A process in accordance with claim 2 wherein said base is selected from the group consisting of sodium hydroxide, potassium hydroxide, and ammonium hydroxide, and wherein said coagulant is comprised of a polyaluminum halide and a second coagulant is a cationic surfactant.

16. A process in accordance with claim 2 wherein there is added to the formed toner aggregates said second latex comprised of submicron resin particles suspended in an aqueous phase containing an anionic surfactant, and wherein said second latex is selected in an amount of from about 10 to about 40 percent by weight of the initial latex (i) to form a shell thereover on said formed aggregates, and which shell is of an optional thickness of about 0.2 to about 0.8 micron, and wherein said coagulant is a polymetal halide.

17. A process in accordance with claim 2 wherein the pH of the mixture resulting in (vi) is increased from about 2 to about 2.6 to about 7 to about 7.5, and wherein said base functions primarily as a stabilizer for the aggregates during coalescence (vii), and no or minimal toner particle size increase results, and wherein said coagulant is a polymetal halide.

18. A process in accordance with claim 2 wherein the temperature at which toner sized aggregates are formed controls the size of the aggregates, and wherein the final toner size is from about 3 to about 15 microns in volume average diameter.

19. A process in accordance with claim 2 wherein the aggregation (iv) temperature is from about 45° C. to about 60° C., and wherein the coalescence or fusion temperature of (vii) and (viii) is from about 80° C. to about 95° C., and wherein said coagulant is a polyaluminum halide.

20. A process in accordance with claim 1 wherein said latex contains a resin, which resin is free of crosslinking and which resin is selected from the group comprised of poly (styrene-alkyl acrylate), poly(styrene-1,3-diene), poly (styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly (styrene-alkyl acrylate-acrylonitrile), poly(styrene-1,3-diene-acrylonitrile), poly(alkyl acrylate-acrylonitrile), poly (styrene-butadiene), poly(methylstyrene-butadiene), poly (methyl methacrylate-butadiene), poly(ethyl methacrylate-butadiene), poly(propyl methacrylate-butadiene), poly(butyl methacrylate-butadiene) poly(methyl acrylate-butadiene), poly(ethyl acrylate-butadiene), poly(propyl acrylate-butadiene), poly(butyl acrylate-butadiene), poly(styrene-isoprene), poly(methylene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile).

21. A process in accordance with claim 20 wherein said resin contains a carboxylic acid selected from the group comprised of acrylic acid, methacrylic acid, itaconic acid, beta carboxy ethyl acrylate, fumaric acid, maleic acid , and cinnamic acid, and wherein carboxylic acid is selected in an amount of from about 0.1 to about 10 weight percent.

22. A process in accordance with claim 20 wherein a crosslinking component monomer is added to said resin to provide a latex resin free of crosslinking, and wherein said monomer is optionally selected in an amount of from about 0.5 to about 15 percent by weight.

23. A process in accordance with claim 1 wherein each of the latexes contains a resin or polymer selected from the group consisting of poly(styrene-alkyl acrylate), poly (styrene-1,3-diene), poly(styrene-alkyl methacrylate), poly (styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly (styrene-alkyl acrylate-acrylonitrile-acrylic acid), poly (styrene-1,3-diene-acrylonitrile-acrylic acid), and poly(alkyl acrylate-acrylonitrile-acrylic acid), and wherein said coagulant is a polymetal halide.

24. A toner process comprising the heating of a magnetite dispersion, a colorant dispersion, a latex emulsion free of crosslinking, a latex emulsion containing a crosslinked resin or polymer, and a coagulant of a polymetal halide, and wherein said mixture is aggregated by heating below the latex resin glass transition temperature, and where said mixture is subsequently heated above the latex resin glass transition temperature.

25. A process in accordance with claim 24 wherein there is further included a second coagulant of a cationic surfactant coagulant.

26. A process in accordance with claim 25 wherein said coagulant is a polymetal halide polyaluminum chloride, and wherein said cationic coagulant is an alkylbenzyl dimethyl ammonium chloride.

27. A process in accordance with claim 1 wherein said coagulant is a polyaluminum chloride, a polyaluminum sulfosilicate, or a polyaluminum sulfate, and there is further added to the mixture a second cationic surfactant coagulant of an alkylbenzyl dimethyl ammonium chloride.

28. A process in accordance with claim 1 wherein said wax dispersion contains a polyethylene wax, water, and an anionic surfactant, and wherein said wax is selected in an amount of from about 5 to about 20 weight percent.

29. A process in accordance with claim 1 wherein said wax dispersion contains a polypropylene wax, water, and an anionic surfactant, and wherein said wax is selected in an amount of from about 5 to about 20 weight percent.

30. A process in accordance with claim 25 wherein the second coagulant is selected from the group comprised of alkylbenzyl dimethyl ammonium chloride, dialkyl benzene-alkyl ammonium chloride, lauryl trimethyl ammonium chloride, alkylbenzyl methyl ammonium chloride, alkyl benzyl dimethyl ammonium bromide, benzalkonium chloride, and cetyl pyridinium bromide present in the amount of about 0.1 to about 5 percent by weight of toner.

31. A process in accordance with claim 1 wherein said acicular magnetite possesses a coercivity of about 250 to about 700 Oe, a particle size of about 0.6 micron in length×0.1 micron in diameter, a coercivity of from about 250 to about 500 Oe, a remanent magnetization (Br) of about 23 to 39 emu/gram, and a saturation magnetization (Bm) of about 70 to about 90 emu/gram; a coercivity of about 345 Oe, a remanent magnetization (Br) of about 35 emu/gram, and a saturation magnetization (Bm) of about 85 emu/gram; a coercivity of about 370 Oe, a remanent magnetization (Br) of about 33 emu/gram, and a saturation magnetization (Bm) of about 83 emu/gram; a magnetite with a coercivity of about 270 Oe, a remanent magnetization (Br) of about 20 emu/gram, and a saturation magnetization (Bm) of about 79 emu/gram; or a coercivity of from about 250 to about 400 Oe, a remanent magnetization (Br) of about 23 to about 55 emu/gram, and a saturation magnetization (Bm) of about 70 to about 90 emu/gram; and wherein said acicular magnetite is present in the toner in an amount of from about 10 to about 40 weight percent.

32. A process in accordance with claim 1 wherein said acicular magnetite possesses a coercivity of about 250 to about 700 Oe, a particle size of about 0.6 micron in length×0.1 micron in diameter, a magnetite with a coercivity of from about 250 to about 500 Oe, a remanent magnetization (Br) of about 23 to about 39 emu/gram, and a saturation magnetization (Bm) of about 70 to about 90 emu/gram; and wherein said wax is a polyethylene, a polypropylene, or mixtures thereof, and said colorant is carbon black.

33. A process comprising heating a mixture of an acicular shaped magnetite dispersion, a black colorant dispersion, a crosslinked resin latex, a latex containing a resin free of crosslinking, and a coagulant, and wherein said heating involves a first heating and subsequently a second heating, and which second heating is at a higher temperature than said first heating, and wherein said first heating is below about the glass transition temperature of said resin free of crosslinking, and wherein said second heating is above the glass transition temperature of said resin free of crosslinking.

34. A process in accordance with claim 1 wherein said colorant in said colorant dispersion is a cyan, a magenta, a yellow, a black or mixtures thereof.

35. A process in accordance with claim 1 wherein said coagulant is comprised of a mixture of coagulants of a polymetal halide, and a second cationic coagulant wherein the first coagulant is present in the amount of about 0.02 to about 0.2 percent by weight of toner, and the second coagulant is present in the amount of about 0.05 to about 2 percent by weight of toner.

36. A process in accordance with claim 1 wherein said latex contains a crosslinked resin selected in an amount of from about 1 to about 40 weight percent.

37. A process in accordance with claim 1 wherein said latex contains a crosslinked resin selected in an amount of from about 2 to about 25 weight percent.

38. A process in accordance with claim 1 wherein said latex contains a crosslinked resin of a poly(styrene butylacrylate, beta carboxy ethyl acrylate divinyl benzene).

39. A process in accordance with claim 1 wherein said resin free from crosslinking possesses a molecular weight $M_w$ of about 20,000 to about 500,000, and an onset glass transition (Tg) temperature of from about 45° C. to about 55° C.

40. A process in accordance with claim 1 wherein said latex contains a crosslinked resin that possesses a molecular weight $M_w$ of from about 100,000 to about 1,000,000, and an onset glass transition (Tg) temperature of about 48° C. to about 58° C.

41. A process in accordance with claim 1 further including a second coagulant.

42. A process in accordance with claim 1 wherein said crosslinked resin latex is selected in an amount of from about 2 to about 15 weight percent, said latex free of a crosslinked resin is selected in an amount of from about 40 to about 65 weight percent, said magnetite is selected in an amount of from about 20 to about 35 weight percent, said wax is selected in an amount of from about 5 to about 15 weight percent, and wherein the total thereof of said components is about 100 percent based on said toner.

43. A process in accordance with claim 1 wherein said resulting toner possesses a shape factor of from about 110 to about 148.

* * * * *